United States Patent [19]

Dmitrowsky

[11] 4,248,448
[45] Feb. 3, 1981

[54] BICYCLE ENABLING A SUBSTANTIALLY FULL LENGTH PRONE RIDING POSITION

[76] Inventor: Igor Dmitrowsky, 92-36 54th Ave., Elmhurst, N.Y. 11373

[21] Appl. No.: 52,409

[22] Filed: Jun. 27, 1979

[51] Int. Cl.³ .............................................. B60K 13/00
[52] U.S. Cl. ................................ 280/261; 280/281 LP
[58] Field of Search ......... 280/281 LP, 281 R, 281 B, 280/261

[56] References Cited

U.S. PATENT DOCUMENTS 846,033   3/1907   Kidney ................................... 280/261

FOREIGN PATENT DOCUMENTS 441733  12/1925  Fed. Rep. of Germany .... 280/281 LP
769547   8/1934  France ....................................... 280/261
236146   1/1945  Switzerland ............................. 280/261
1300566 12/1972  United Kingdom ..................... 280/261

Primary Examiner—John A. Pekar
Attorney, Agent, or Firm—Nicholas J. Garofalo

[57] ABSTRACT

A bicycle having a frame extended rearwardly and beyond the rear wheel of the bicycle provided in the extended portion with a pedal crank driven sprocket connected by an endless drive chain with a sprocket gear carried by the rear wheel, the extended portion being in one form of the invention an integral part of the frame, or being in a modified form of the invention an accessory unit separably attachable to the conventional frame of a bicycle, in which modified form the sprocket gear is connectible by the drive chain, at the election of the rider, with either the pedal crank driven sprocket in the accessory unit or with the normal pedal crank driven sprocket in the conventional frame.

1 Claim, 7 Drawing Figures

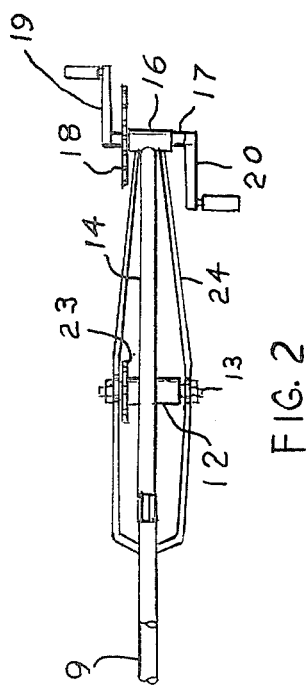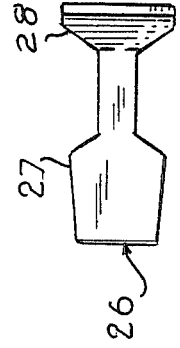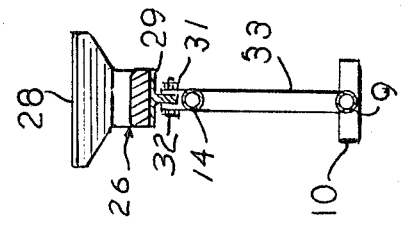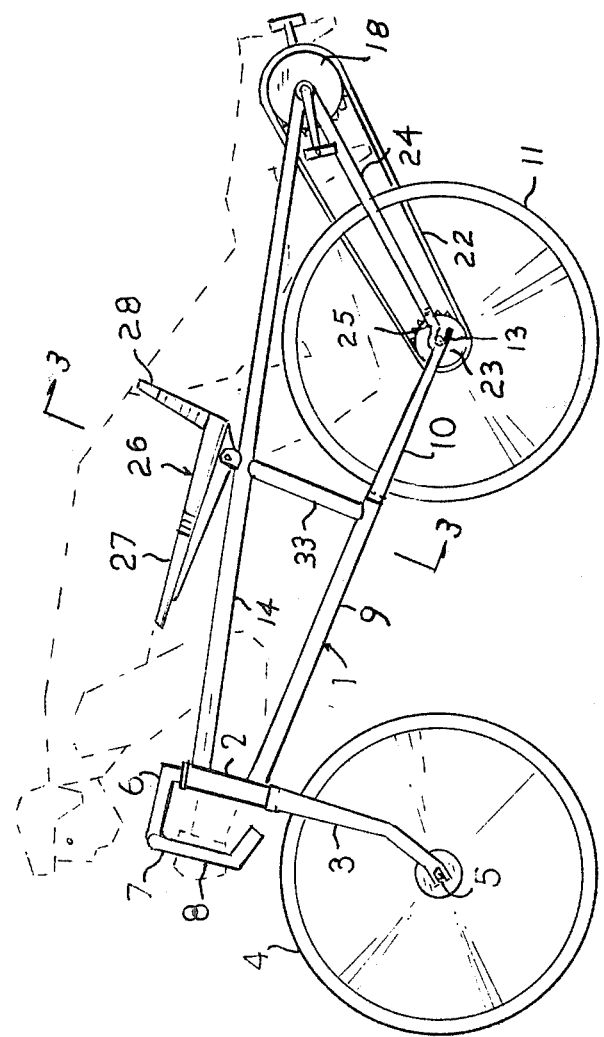

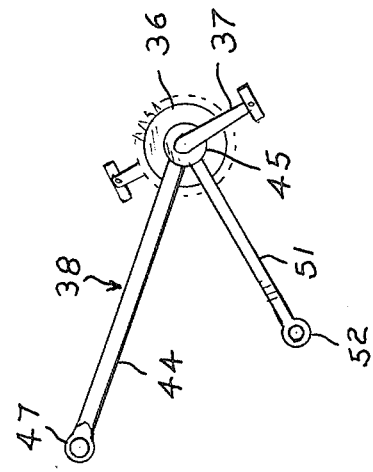
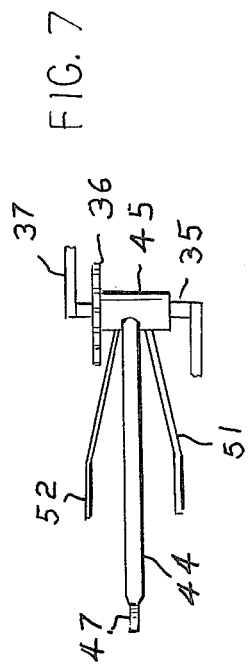
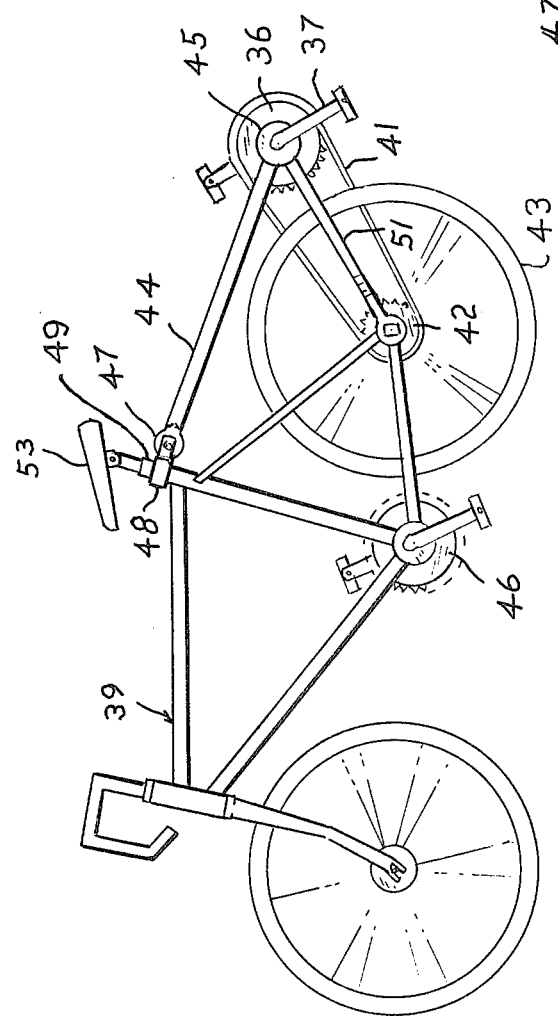

BICYCLE ENABLING A SUBSTANTIALLY FULL LENGTH PRONE RIDING POSITION

BACKGROUND OF THE INVENTION

This invention is directed to improvements in bicycles. It is particularly concerned with a bicycle with a frame having an extension rearwardly of and beyond its rear wheel, in which extension a pedal driven crankshaft together with means for driving the rear wheel is supported.

A desirable advantage of a bicycle of this construction is that it enables the rider to obtain a substantially full length prone position when pedalling, and enables him to maintain this riding position with reasonable comfort.

In bicycling, particularly when it is desired to obtain added speed, it has been found that this can be accomplished if the rider assumes a substantially prone torso position so that his body will present reduced resistance to opposing air forces.

However, the degree of reduction in resistance to air forces that can be obtained in this manner is presently limited, because the structure of the conventional bicycle does not enable the rider to obtain a substantially full length prone position when pedalling. In the conventional bicycle the pedal driven crankshaft and the chain drive sprocket carried by it are located in an area of the frame forwardly of the rear wheel and below the saddle. This construction enables the torso of the rider but not his legs to obtain a substantially prone position. Accordingly, his legs depend at about right angles to the prone torso and thereby impede free flow of opposing air forces. Further, this depending disposition of the legs relative to the prone torso creates a cramped condition of body and legs which interferes with the comfort of the rider.

In the present invention the bicycle is structured in its frame so as to support the pedal driven crankshaft and the associated drive means beyond and rearwardly of the rear wheel. By means of this arrangement the rider is enabled to obtain a substantially full length prone position while pendalling. This allows opposing air forces to more easily flow over the rider's body and thereby present less impedance to forward movement of the bicycle than would otherwise be provided by the position obtained by the rider on a conventional bicycle. Further, by means of this arrangement the legs of the rider are disposed substantially in line with his torso, whereby the cramped condition mentioned earlier is avoided.

A main feature of the invention is a bicycle frame supporting a front and a rear wheel, and having a portion of its frame extending rearwardly of an beyond the rear wheel, in the end of which extended portion is supported a pedal driven crankshaft and a drive sprocket connected by an endless drive chain to the usual sprocket gear carried by the rear wheel.

A further feature of the invention is exhibited in a modified form thereof in which the extension of the frame beyond and rearwardly of the rear wheel is in the form of a separable attachment or accessory unit. The pedal driven crankshaft and drive sprocket are supported in this unit; and the unit is provided withn suitable means whereby it may be removably attached to the rear of a conventional frame of a bicycle.

A further advantage of this modified form is that it enables the existing endless drive chain of the associated bicycle to be drivingly connected, at the election of the rider, to either the existing drive sprocket of the bicycle or to the drive sprocket of the accessory unit. By means of this arrangement the rider may elect to ride the bicycle in conventional upright manner, or in the prone manner enabled by the accessory unit.

Another feature of the invention is a saddle which is elongated to provide a degree of support for the rider's torso in the prone position; and it is adjustable angularly, as needed, to provide a desirable confortable engagement with the rider's body.

The foregoing mentioned structures, features and advantages of the invention will become increasingly apparent as this specification unfolds in greater detail, and as it is read in conjunction with the accompanying drawing wherein an embodiment of the invention is shown. However, it is to be expressly understood that the drawing is for purposes of illustration; and it is not to be construed as limiting the scope of the invention.

BRIEF DESCRIPTION OF THE DRAWING

In the accompanying drawing:

FIG. 1 is a side elevational view of a bicycle embodying the invention;

FIG. 2 is a top plan view of FIG. 1 with some portions broken away or omitted for added clarity;

FIG. 3 is a sectional view taken on line 3—3 of FIG. 1, illustrating the pivotal mounting of the saddle to the frame of the bicycle; and FIG. 4 is a top plan view of the saddle;

FIG. 5 is a modified form of the invention in which a separable attachment or accessory unit carrying the crankshaft and associated drive sprocket is shown as detachably mounted to the frame of a conventional bicycle;

FIG. 6 is a side elevational view of the attachment or accessory unit apart from the bicycle; and FIG. 7 is a top plan view of FIG. 6.

DETAILED DESCRIPTION OF THE INVENTION

For a more detailed understanding of the invention, as this description continues reference is directed to the accompanying drawing, and now it is directed especially to FIGS. 1-4 wherein a bicycle embodying the invention is shown.

The bicycle includes a supporting frame 1 having a steering head or sleeve 2 at its front end. Swiveled in the head is a depending steering wheel fork 3 in which a spoked and tired front or steering wheel 4 is mounted by means of its hub for rotation about an axle 5. The axle is mounted in the lower ends of the fork; and it is secured in position in conventional manner. The fork terminates at its upper end above the head in a steering post 6 upon which a handlebar 7 is mounted. Here the handlebar is shown as having downwardly disposed handles 8 in conventional racing style.

The frame has a bottom or lower supporting truss member 9 which extends downward and rearward from the back of the steering head 2, and terminates in a rearwardly extending fork 10. A spoked and tired rear drive wheel 11 is mounted by means of its hub 12 for rotation about an axle 13. The latter is supported in bifurcated ends of the arms of fork 10; and it is secured in place in conventional manner.

A top truss or upper supporting member 14 of the frame extends downward and rearward from the back of the steering head. It passes over and clear of the rear wheel 11 to a point rearwardly beyond the latter.

Truss member 14 terminates at its rear in a crankshaft crosshead or sleeve 16. The latter supports for relative rotation a conventional crankshaft 17. The crankshaft carries at one end a chain drive sprocket 18 with an associated pedal crank 19; and it carries at its opposite end a second pedal crank 20. Cranks 19 and 20 are provided with pedals which, if desired, may be equipped with conventional toe clips or the like, not shown.

An endless drive chain 22 drivingly connects the drive sprocket 18 with a sprocket gear 23 fixed to the hub of the rear wheel 11, whereby rotation of the drive sprocket 18 is transmitted to the rear wheel.

Added support for the crankshaft sleeve 16 is provided by means of a pair of truss members 24. The upper ends of the truss members are fixed to opposite end areas of sleeve 16; and the opposite lower ends 25 of the truss members are fixed to opposite end portions of the rear fork 10.

A saddle 26 is provided for the rider. Here, the saddle has an elongated forward portion 27 and a back portion 28. It is provided with a mounting rib 29 along its underside, which rib is received in a clevis 31 mounted intermediately of the ends of the upper truss member 14. A bolt 32 passed through the ears of the clevis and the mounting rib, and engaged by a nut serves to secure the saddle in place. Before tightening the nut the saddle may be angularly adjusted about the bolt to a position best suited to the comfort of the rider.

The frame is further provided with a brace or strengthening cross rib 33 fixed below the clevis between the upper and lower truss members 14 and 9, thus providing a desirable frame support where the rider load on the bicycle is greatest.

In using the bicycle the rider positions himself astride the saddle and leans forwardly and downwardly to a substantially prone position of his torso upon the saddle, with his arms extended forwardly and his hands gripping the handles of the handlebar, and with his legs extended rearwardly and his feet engaging the foot pedals, as indicated in broken line in FIG. 1. In this position, which is a substantially full length prone position, the rider activates his legs and feet to drive the crankshaft so as to transmit rotation to the rear wheel and forward movement of the bicycle.

The elongated portion 27 of the saddle provides a comfortable degree of support to the prone torso of the rider; and the back portion 28 of the saddle provides support to his backside.

Good results in the structure and operation of the bicycle have been found when the truss members 24 supporting the crankshaft sleeve 16 form an angle of approximately 60 degrees with a vertical line through the axis of the rear wheel 11.

MODIFIED FORM OF THE INVENTION

Reference is now directed to FIGS. 5-7 of the drawing, wherein a modified form of the invention is illustrated.

In this form a conventional crankshaft 35, together with an associated chain drive sprocket 36 and pedal cranks 37, is mounted in an attachment or accessory unit 38, as seen in FIG. 6. The unit is adapted to be removably attached to the frame 39 of a conventional bicycle, as indicated in FIG. 5; and its drive sprocket 36 is adapted to be drivingly connected by the bicycle's drive chain 41 with the sprocket gear 42 of the rear drive wheel 43 of the bicycle.

Unit 38 has an upper supporting truss member 44 which carries at its rear end a conventional crankshaft sleeve 45. The latter supports the crankshaft 35 together with the associated drive sprocket 36 and pedal cranks 37. The drive sprocket corresponds in diameter to that of the existing or main drive sprocket 46 mounted in the bicycle's frame 39. A free forward end of truss member 44 is provided with suitable mounting structure, such as a flat terminal ring 47. The ring is adapted to be securely engaged with a clamp 48 disposed about the upwardly extending seat tube 49 of the bicycle.

The unit 38 has fixed to it further means for supporting it to the bicycle. This is provided by a pair of lower truss elements 51, each of which extends in parallel relation to the other from opposite end areas of the crankshaft sleeve 45. Each of the truss elements is provided at its forward or free end with suitable mounting structure, such as a flat terminal ring 52. Each ring 52 is adapted to be slipped over a separate projecting end of the axle of the rear drive wheel 43; and to be secured in place by the usual nut carried by the axle.

When assembled to the frame of a conventional bicycle, the unit 38 obtains the position indicated in FIG. 5, in which the drive sprocket 36 of the unit is located rearwardly of and beyond the rear drive wheel 43. Good results in the structure of the unit and in its use in the operation of the bicycle to which it is attached have been found when the lower truss elements 51 of the unit form an angle of approximately 60 degrees with a vertical line passed through the axis of the rear drive wheel.

Further, the unit is preferably structured so that, when it is assembled to a conventional bicycle, the axis of the drive sprocket 36 of the unit and the axis of the drive sprocket 46 of the bicycle are equally distant from the axis of the sprocket gear 42 carried by the rear drive wheel 43. By means of this arrangement the endless drive chain 41 may be selectively employed to drivingly engage either the drive sprocket 36 of the unit or the drive sprocket 46 of the bicycle with the sprocket gear 42.

The regular saddle 53 with which the conventional bicycle is equipped, as indicated in FIG. 5, may be employed when using the accessory unit 38. It may be angularly adjusted about its mounting to suitably engage the seat of the rider in the prone position of the latter. However, the saddle shown in FIG. 1 would be more suitable.

While an embodiment of the invention and a modification thereof have been illustrated and described in detail herein, it is to be expressly understood that the invention is not limited thereto. Various changes of form, design or arrangement may be made in its components without departing from the spirit and scope of the invention. It is my intent, therefore, to claim the invention not only as shown and described, but also in all such forms, modifications or equivalents thereof as might reasonably be construed to be within the spirit of the invention when considered in the light of the specification, the drawings, and the appended claims.

What is claimed is:

1. A rear wheel drive unit removably attachable as an accessory to the rear of the frame of a bicycle that has a rearwardly extending fork supporting an axle upon which axle a rear drive wheel carrying a chain driven sprocket gear is mounted; the unit comprising a crankshaft sleeve, a pedal crank driven sprocket supported by the sleeve, elongated truss means fixed at one end to the sleeve and adapted at its other end to be removably attached to a rear portion of the frame of the bicycle so as to support the sleeve rearwardly of and beyond the rear drive wheel, the pedal crank driven sprocket being adapted for driving engagement by means of an endless drive chain with the sprocket gear, wherein the elongated truss means includes an elongated truss member fixed at one end to the sleeve and having at its opposite end means for removably mounting it to the frame; and the truss means further includes a pair of elongated truss elements, each element of the pair being fixed at one end to the sleeve and having at its opposite end means for removably supporting it on the axle of the rear drive wheel.

* * * * *